United States Patent [19]
Gordan

[11] Patent Number: 6,080,462
[45] Date of Patent: Jun. 27, 2000

[54] FIRE-RESISTANT GEL PADS

[75] Inventor: Ronald Gordan, Marlboro, N.J.

[73] Assignee: Henkel Corporation, Gulph Mills, Pa.

[21] Appl. No.: 08/710,622

[22] Filed: Sep. 20, 1996

Related U.S. Application Data

[60] Provisional application No. 60/006,212, Nov. 3, 1995.
[51] Int. Cl.⁷ .............................. B32B 1/06; C09K 21/06
[52] U.S. Cl. ............................. 428/76; 428/36.8; 428/68; 252/610
[58] Field of Search .............................. 428/35.7, 68, 76, 428/36.8; 252/610

[56] References Cited

U.S. PATENT DOCUMENTS

| | | | |
|---|---|---|---|
| 4,097,385 | 6/1978 | Von Bonin | 428/36.9 |
| 4,342,665 | 8/1982 | Itoh | 252/610 |
| 4,456,642 | 6/1984 | Burgdorfer | 428/427 |
| 5,518,638 | 5/1996 | Buil | 252/610 |
| 5,580,661 | 12/1996 | Von Bonin | 428/427 |

*Primary Examiner*—Patricia A. Short
*Attorney, Agent, or Firm*—Ernest G. Szoke; Wayne C. Jaeschke; Steven J. Trzaska

[57] ABSTRACT

A process for making fire-resistant gel pads comprising: (a) providing a fire-resistant liquid polyol ester; (b) providing a gellant; (c) mixing components (a) and (b) to form a fire-resistant gel; (d) providing a flexible, elastic casing; and (e) encasing the fire-resistant gel in the flexible, elastic casing.

13 Claims, No Drawings

FIRE-RESISTANT GEL PADS

CROSS-REFERENCE TO RELATED APPLICATIONS

This application claims priority from U.S. provisional application Ser. No. 60/006212, filed Nov. 3, 1995, the disclosure of which is incorporated herein by reference.

FIELD OF THE INVENTION

The present invention generally relates to fire-resistant gels contained in flexible, elastic casings. More particularly, the present invention is directed to a composition and process for making fire-resistant gel pads/casings suitable for use as a mattress, mattress insert, seat cushion and the like.

BACKGROUND OF THE INVENTION

The fire-resistant gel pads of the present invention are particularly suited for use as wheelchair seat cushions and mattresses which are intended for use by patients confined to wheelchairs or beds for substantial periods of time. It is important to note, however, that these novel gel pads also find advantageous utility in general body-support cushioning applications such as, for example, automobile and furniture cushions.

In the past, cushion structures of the so-called inner spring, foam rubber, and pneumatic types have commonly been employed as seat cushions and mattresses. These devices have not met with complete success, particularly with respect to applications wherein prolonged confinement by the person using the same was required. One of the reasons why these prior art structures have been generally unsatisfactory in such uses is that they are not capable of permitting unrestrained lateral movement of that part of the patient's body which is adjacent to the supporting surface. Such unrestrained lateral movement is essential in order to prevent damage to a patient's skin.

It is known that with bedridden patients and those confined to wheelchairs, subjecting the skin of such individuals to constant pressure tends to produce a breakdown which results in decubitus ulcers, commonly known as bed sores. To prevent such decubitus ulcers from forming, it is important to establish a reduction of pressure over the localized areas of bony prominences since the most acute cases of such decubitus ulcers occur where the bony structure of the patient is close to the supporting surfaces, for example, over the sacrum or ischial tuberosities, so that the support of the patient tends to be concentrated in relatively small pressure areas of the supporting surface.

Efforts to solve this problem have resulted in the development of gel cushions composed of an organosiloxane gel material. While these and other types of gels have proven to be successful in providing the patient with a comfortable surface on which to rest, without subjecting their skin to constant pressure, their exists a danger associated with the flammability of these types of gel pads. The gels used as filler material for these types of pads are not fire-resistant. Thus, if a chair seat or mattress being used by a person who, for whatever reason, is confined thereto should catch fire, the gel present within the pad will further worsen an already dangerous situation due to its flammability.

The present invention overcomes this disadvantage by providing a gel support structure or cushion which is fire-resistant.

SUMMARY OF THE INVENTION

The present invention is directed to a process for making fire-resistant gel pads involving the steps of:

(a) providing a fire-resistant liquid polyol ester;
(b) providing a gellant;
(c) mixing components (a) and (b) to form a fire-resistant gel;
(d) providing a flexible, elastic casing; and
(e) encasing the fire-resistant gel in the flexible, elastic casing.

The present invention also provides a pad containing a fire-resistant gel encased in a flexible, elastic casing, the fire-resistant gel containing a fire-resistant liquid polyol ester in combination with a gellant.

A fire-resistant gel composition is also provided containing a fire-resistant liquid polyol ester and a gellant.

DESCRIPTION OF THE INVENTION

Other than in the operating examples, or where otherwise indicated, all numbers expressing quantities of ingredients or reaction conditions used herein are to be understood as being modified in all instances by the term "about".

According to the present invention a fire-resistant gel pad/casing is made by encasing the fire-resistant gel within a flexible, elastic casing/pad (preferably comprising a polymer film or a coated textile). The term "gel" as used herein is intended to describe the physical nature of the jelly-like or gelatinous end product rather than to represent the exact polymer-physical structure. The term "gel" does not, however, exclude compositions which may have the same homogeneous structure as is generally attributed to gels by those skilled in the art of colloid chemistry.

The fire-resistant gel of the present invention is preferably formed by combining a fire-resistant liquid polyol ester and a gellant. Examples of suitable liquid polyol esters for use in the present invention include pentaerythritol tetraoleate, a dimer acid diester and mixtures thereof. The dimer acid diesters are characterized by their high viscosity ranging from about 10 to about 20 centistokes at 100° C. and low pour points ranging from about −40 to about −60. These dimer acid diesters are commercially available from Henkel Corp., Emery Division, under the tradenames EMERY® 2900 and EMERY® 2905. In a particularly preferred embodiment of the present invention, the liquid polyol esters employed are the above-disclosed dimer acid diesters.

The gellant of the present invention may consist of (a) a grease component selected from the group consisting of an aluminum complex grease, a lithium hydroxide grease, and mixtures thereof, (b) a fatty acid, and (c) benzoic acid. The liquid polyol ester, fatty acid and benzoic acid are first combined, with mixing, and then heated to a temperature capable of melting the acids, preferably in the range from about 80° C. to about 90° C. to form a precursor mixture. Once the acids are sufficiently melted, the grease component, preferably aluminum complex grease is then added to the precursor mixture, with stirring, until the temperature of the mixture reaches about 200° C. to form a final mixture. The final mixture is then cooled to a temperature of less than about 95° C. The cooled final mixture is then milled to form the fire-resistant gel of the present invention.

In a particularly preferred embodiment of the present invention, the grease component employed is the aluminum complex grease. Suitable aluminum complex greases for use in the formulation of the fire-resistant gels of the present invention include, but are not limited to, those derived from an aluminum source, a benzoic acid, a fatty acid and a carrier oil, commercially available under the tradename KOLATES®, and specifically KOLATE® LV, commercially available from Rhone-Poulenc, Inc.

The fatty acids used in the present invention are generally those having from 4 to 22 carbon atoms and a terminal carboxyl group. They may be saturated or unsaturated, natural or synthetic. One example of a fatty acid suitable for use in the present invention is HYSTRENE® 5522, commercially available from Witco, Inc.

According to another embodiment of the present invention, the gellant used may consist of an organoclay in combination with an activator. Examples of suitable organoclays which may be employed include, but are not limited to, bentonite, hectorite and mixtures thereof. The organoclay component is typically obtained in the form of agglomerated platelet stacks. In order to both fully disperse the platelet stacks and delaminate the individual platelets within the stacks, both chemical and mechanical energy is required. The mechanical energy may be obtained via stirring or some similar low shear force so that the agglomerated platelet stacks may be wet out. The chemical energy is obtained by the use of a polar activator which forces the platelets further apart. Examples of suitable polar activators include, but are not limited to, water, acetone, a 95:5 mixture of methanol and water, a 95:5 mixture of food grade ethanol and water, and propylene carbonate. In a particularly preferred embodiment, propylene carbonate is the polar activator employed. As was noted above, these components are mixed/stirred at a temperature above 25° C. until a gel is formed, followed by milling.

An example of a specific organoclay component suitable for use as a gellant in the formulation of the present invention is BARAGEL® 10, commercially available from Rheox Corp.

The fire-resistant gels, once formulated, generally have a soft, somewhat tacky, gelatinous consistency. For better manipulation of these gels in order to more evenly distribute the contact pressure, it is necessary in practice to provide them with a casing/pad. The casing must be formed in such a manner that it offers as little resistance as possible to the deformation tendency of the gel under pressure.

Elastic films can be used as one such casing. Any of the polymer films with a good viscoelastic behavior and high elongation at break and breaking force are particularly suitable. Suitable films include, but are not limited to, those made from polyurethane, thermoplastic polyester elastomers, block copolymers based on styrene and butadiene. It is also possible to use films of plasticized polyvinyl chloride. Such films can be thermally shaped, welded or subjected to adhesive bonding. With the aid of these techniques, it is quite simple to prepare suitable covers for the fire-resistant gels of the present invention.

It should be noted, however, that while the present invention contemplates the use of pads/casings/coverings shaped in a form suitable for use as a mattress, seat cushion and the like, any shape suitable for dispersing a person's weight resting thereon may be employed.

The fire-resistant gel s of the present invention can also be encased by a process in which a resilient material, in liquid or dissolved form, is applied onto the gel surface and is allowed to solidify or to undergo another film-forming reaction thereon.

The present invention will be better understood from the example which follows, which is intended to be illustrative only and not meant to unduly limit the scope of the invention. Unless otherwise indicated, percentages are on a weight-by-weight basis.

EXAMPLE

A 5000 gram batch of fire-resistant gel was prepared per the following process. To a kettle there was added, with stirring, 4300 grams of 2898 PE, a liquid fire-resistant tetraoleate ester commercially available from Henkel KGaA, 485.7 grams of HYSTRENE® 5522, a fatty acid commercially available from Witco Corp. and 172.1 grams of benzoic acid to form a precursor mixture. The mixture was then heated to a temperature of from about 82–88° C. in order to melt the acids. To the mixture there was then added, with stirring, 333 grams of KOLATE® LV, an aluminum complex grease commercially available from Rhone-Poulenc, Inc. The mixture was then brought to a temperature of about 199° C. with continuous stirring to form a final mixture. The final mixture was then cooled to a temperature of less than about 93° C. and then milled to form the finished fire-resistant gel product.

What is claimed is:

1. A process for making fire-resistant gel pads comprising:
   (a) providing a fire-resistant liquid polyol ester;
   (b) providing a gellant comprising an aluminum complex grease, a fatty acid and benzoic acid;
   (c) mixing components (a) and (b) to form a fire-resistant gel;
   (d) providing a flexible, elastic casing; and
   (e) encasing the fire-resistant gal in the flexible, elastic casing.

2. The process of claim 1 wherein the fire-resistant liquid polyol ester is selected from the group consisting of a pentaerythritol tetraoleate, a dimer acid diester, and mixtures thereof.

3. The process of claim 1 wherein the fire-resistant liquid polyol ester is a dimer acid diester.

4. The process of claim 3 wherein the dimer acid diester has a vicosity at 100° C. ranging from about 10 to about 20 centistokes.

5. The process of claim 3 wherein the dimer acid diester has a pour point ranging from about −40 to about −60.

6. The process of claim 1 wherein the flexible, elastic casing is selected from the group consisting of a mattress, a mattress insert, a wheelchair cushion, a seat cushion, and a seat cushion support.

7. The process of claim 1 wherein components (a)–(c) are gelled at a temperature ranging from about 80 to about 90° C.

8. A pad comprising a fire-resistant gel encased in a flexible, elastic casing, the fire-resistant gel comprising a fire-resistant liquid polyol ester in combination with a gallant comprising an aluminum complex grease, a fatty acid and benzoic acid.

9. The pad of claim 8, wherein the fire-resistant liquid polyol ester is selected from the group consisting of a pentaerythritol tetraoleate, a dimer acid diester, and mixtures thereof.

10. The pad of claim 9 wherein the fire-resistant liquid polyol ester is a dimer acid diester.

11. The pad of claim 10 wherein the dimer acid diester has a vicosity at 100° C. ranging from about 10 to about 20 centistokes.

12. The pad of claim 10 wherein the dimer acid diester has a pour point ranging from about −40 to about −60.

13. The pad of claim 8 wherein the flexible, elastic casing is selected from the group consisting of a mattress, a mattress insert, a wheelchair cushion, a seat cushion, and a seat cushion support.

* * * * *